(12) United States Patent
Hazel

(10) Patent No.: US 7,579,085 B2
(45) Date of Patent: Aug. 25, 2009

(54) COATED SILICON COMPRISING MATERIAL FOR PROTECTION AGAINST ENVIRONMENTAL CORROSION

(75) Inventor: Brian Thomas Hazel, West Chester, OH (US)

(73) Assignee: General Electric Company, Schnectady, NY (US)

(*) Notice: Subject to any disclaimer, the term of this patent is extended or adjusted under 35 U.S.C. 154(b) by 309 days.

(21) Appl. No.: 11/208,245

(22) Filed: Aug. 19, 2005

(65) Prior Publication Data

US 2007/0292616 A1 Dec. 20, 2007

(51) Int. Cl.
*B32B 9/00* (2006.01)
*B32B 15/00* (2006.01)

(52) U.S. Cl. ............... 428/446; 428/469; 428/472; 428/701; 428/702; 416/241 B

(58) Field of Classification Search .......... None
See application file for complete search history.

(56) References Cited

U.S. PATENT DOCUMENTS

| | | | |
|---|---|---|---|
| 4,055,705 A | 10/1977 | Stecura et al. | 428/633 |
| 4,328,285 A | 5/1982 | Siemers et al. | 428/633 |
| 4,535,033 A | 8/1985 | Stecura | 428/633 |
| 4,975,330 A | 12/1990 | Mosser | 428/472.1 |
| 5,216,808 A | 6/1993 | Martus et al. | 29/889.1 |
| 5,236,745 A | 8/1993 | Gupta et al. | 427/454 |
| 5,260,099 A | 11/1993 | Haskell | 427/367 |
| 5,660,885 A | 8/1997 | Hasz et al. | 427/374.5 |
| 5,773,141 A | 6/1998 | Hasz et al. | 428/335 |
| 5,792,521 A | 8/1998 | Wortman | 427/567 |
| 5,851,678 A | 12/1998 | Hasz et al. | 428/469 |
| 5,871,820 A | 2/1999 | Hasz et al. | 427/419.2 |
| 5,914,189 A | 6/1999 | Hasz et al. | 428/335 |
| 5,985,470 A | 11/1999 | Spitsberg et al. | 428/689 |
| 6,025,078 A | 2/2000 | Rickerby et al. | 428/469 |
| 6,117,560 A | 9/2000 | Maloney | 428/472 |
| 6,177,200 B1 | 1/2001 | Maloney | 428/472 |
| 6,284,323 B1 | 9/2001 | Maloney | 427/419.2 |
| 6,296,945 B1 * | 10/2001 | Subramanian | 428/469 |
| 6,319,614 B1 | 11/2001 | Beele | 428/469 |
| 6,410,148 B1 | 6/2002 | Eaton, Jr. et al. | 428/446 |
| 6,444,335 B1 | 9/2002 | Wang et al. | 428/701 |
| 6,544,351 B2 | 4/2003 | Wang et al. | 148/22 |
| 6,562,409 B2 | 5/2003 | Koshkarian et al. | 427/376.2 |
| 6,620,465 B2 | 9/2003 | Rigney et al. | 427/567 |
| 6,627,323 B2 | 9/2003 | Nagaraj et al. | 428/469 |

(Continued)

OTHER PUBLICATIONS

Wu, J. et al., "Low-Thermal-Conductivity Rare-Earth Zirconates for Potential Thermal-Barrier-Coating Applications", Dec. 2002, pp. 3031-3035, Journal of the American Ceramic Society, vol. 85, No. 12.

(Continued)

*Primary Examiner*—Timothy M Speer
(74) *Attorney, Agent, or Firm*—Christine Beninati; Marcella R. Louke; William Scott Andes

(57) ABSTRACT

In accordance with an embodiment of the invention, an article is disclosed. The article comprises a gas turbine engine component substrate comprising a silicon material; and an environmental barrier coating overlying the substrate, wherein the environmental barrier coating comprises cerium oxide, and the cerium oxide reduces formation of silicate glass on the substrate upon exposure to corrodant sulfates.

15 Claims, 1 Drawing Sheet

U.S. PATENT DOCUMENTS

| | | | | |
|---|---|---|---|---|
| 6,730,422 | B2 | 5/2004 | Litton et al. | 428/701 |
| 6,730,918 | B2 | 5/2004 | Srivastava et al. | 250/458.1 |
| 6,733,908 | B1 | 5/2004 | Lee et al. | 428/702 |
| 6,759,151 | B1 | 7/2004 | Lee | 428/701 |
| 6,858,334 | B1 | 2/2005 | Gorman et al. | 428/701 |
| 7,318,955 | B2 * | 1/2008 | Darolia et al. | 428/141 |
| 7,364,807 | B2 * | 4/2008 | Boutwell et al. | 428/701 |
| 2002/0028344 | A1 | 3/2002 | Beele | 428/632 |
| 2003/0108768 | A1 * | 6/2003 | Subramanian | 428/689 |
| 2004/0175597 | A1 | 9/2004 | Litton et al. | 428/702 |

OTHER PUBLICATIONS

Hill, M.D. et al., "Creating an Effective Barrier", Internet Article Posted Sep. 4, 2003, pp. 1-5, http://www.ceramicindustry.com/CDA/ArticleInformation/coverstory/BNPCoverstoryIte . . .

"Next Generation Thermal Barrier Coatings Using DVD", pp. 1-8, Internet Article http://www.ipm.virginia.edu/newresearch/tbc/home.php, Intelligent Processing of Materials LA, Research at IPM Laboratories.

Bruce, Robert W., "Development of 1232° C (2250° F) Erosion and Impact Tests for Thermal Barrier Coatings ©", 12 pgs., Tribology Transactions, vol. 41 (1998).

* cited by examiner

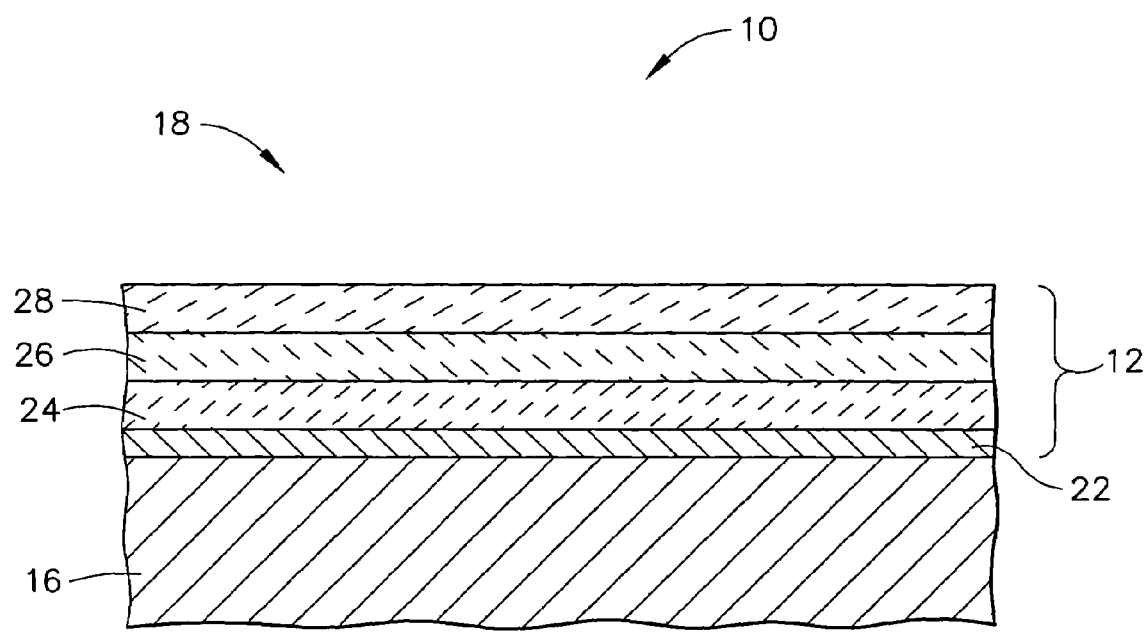

US 7,579,085 B2

COATED SILICON COMPRISING MATERIAL FOR PROTECTION AGAINST ENVIRONMENTAL CORROSION

GOVERNMENT RIGHTS

The invention was made in part under contract number NAS3-01135 awarded by the Government (NASA). Accordingly, the Government has certain rights in this invention.

FIELD OF THE INVENTION

This invention relates to protecting materials comprising silicon from environmental corrosion, such as that experienced in the hostile thermal environment of a gas turbine engine. More particularly, the invention relates to an environmental barrier coating (EBC) system for use on silicon comprising substrates for providing protection against environmental corrosion.

BACKGROUND OF THE INVENTION

Higher operating temperatures for gas turbine engines are continuously sought in order to increase efficiency. However, as operating temperatures increase, the high temperature durability of the components within the engine must correspondingly increase. In this regard, materials comprising silicon, particularly those with silicon carbide (SiC) as a matrix material or a reinforcing material, are considered useful for high temperature applications, such as for combustor and other hot section components of gas turbine engines.

However, some silicon substrates may recede and lose mass as a result of formation of volatile Si species, particularly $Si(OH)_x$ and SiO when exposed to high temperature, aqueous environments, thus necessitating the use of a protective coating thereon. Accordingly, methods such as described in U.S. Pat. Nos. 5,985,470, 6,444,335, 6,410,148 and 6,759,151, the contents of each of which are incorporated by reference, have addressed shortcomings concerning the use of such silicon substrates by providing an environmental barrier coating (EBC) over the substrate. The EBCs inhibit formation of volatile silicon species, $Si(OH)_x$ and SiO, thereby reducing recession and mass loss. A thermal barrier coating (TBC) typically comprising yttria stabilized zirconia may also be employed as an outer layer to the EBC depending upon the operating conditions employed.

While the current state of the art EBCs, which are typically multi-layer EBCs, may be effective in preventing water vapor recession of the ceramic matrix composite (CMC) substrate, both BSAS, SiC and some rare earth silicates such as some silicates disclosed in U.S. Pat. No. 6,759,151 may be susceptible to silicate glass formation when in contact with sulfate salt deposits as operating conditions continue to increase.

Accordingly, there is a need to reduce the silicate glass formation rate in materials comprising silicon, particularly in EBC materials. Embodiments of the present invention satisfy this need and others.

BRIEF DESCRIPTION OF THE INVENTION

In accordance with an embodiment of the invention, an article is disclosed. The article comprises a gas turbine engine component substrate comprising a silicon material; and an environmental barrier coating overlying the substrate, wherein the environmental barrier coating comprises cerium oxide, and the cerium oxide reduces formation of silicate glass on the substrate upon exposure to corrodant sulfates.

In accordance with another embodiment of the invention, an article comprises a gas turbine engine component substrate comprising a silicon material. The article further comprises a bond layer comprising a silicon material and overlying the substrate; a first layer comprising mullite and overlying the bond layer; a second layer comprising an barium strontium aluminosilicate and overlying the first layer; and a third layer consisting of cerium oxide and overlying the second layer. The cerium oxide reduces formation of silicate glass on the substrate upon exposure to corrodant sulfates.

In accordance with another embodiment of the invention, a gas turbine engine component is disclosed. The component comprises a substrate comprising a silicon material; and at least one layer on the substrate selected from the group consisting of: i) an environmental barrier coating comprising cerium oxide, and ii) a dual layer of barium strontium aluminosilicate and a layer consisting of cerium oxide overlying the barium strontium aluminosilicate; wherein the cerium oxide reduces formation of silicate glass on the substrate.

In accordance with a further embodiment of the invention, a gas turbine engine component comprises a substrate comprising a silicon material. Cerium oxide is deposited directly on the substrate or admixed with the silicon material of the substrate, wherein the cerium oxide reduces formation of silicate glass on the substrate upon exposure to corrodant sulfates.

In accordance with another embodiment, a method of reducing silicate glass formation on a gas turbine engine component is disclosed. The method comprises providing a substrate of the gas turbine engine component, wherein the substrate comprises a silicon material; and depositing cerium oxide directly on the substrate or admixing cerium oxide with the silicon material of the substrate. The cerium oxide reduces formation of silicon glass on the substrate upon exposure to corrodant sulfates.

In accordance with another embodiment, a method of reducing silicate glass formation on a gas turbine engine component comprises providing a substrate of the gas turbine engine component, wherein the substrate comprises a silicon material. The method further comprises depositing a bond layer comprising a silicon material and overlying the substrate; depositing a first layer comprising mullite and overlying the bond layer; depositing a second layer comprising an environmental barrier coating overlying the first layer; and depositing a layer consisting of cerium oxide overlying second layer or admixing cerium oxide with barium strontium aluminosilicate. The cerium oxide reduces formation of silicon glass on the substrate upon exposure to corrodant sulfates.

Other features and advantages will be apparent from the following more detailed description, taken in conjunction with the accompanying drawing, which illustrate by way of example the principles of the invention.

BRIEF DESCRIPTION OF THE DRAWING

FIG. 1 is a cross-sectional view of a gas turbine engine component formed of a material comprising Si and having an environmental barrier coating thereon, in accordance with an embodiment of the invention.

DETAILED DESCRIPTION OF THE INVENTION

Applicant has determined through testing that silicon comprising materials may adversely react with deposited sulfates. For example, this material may react with $Na_2SO_4$ at temperatures such as about 1700° F. (927° C.) and higher, and $MgSO_4/CaSO_4$ may react at temperatures such as about 2200° F. (1204° C.) and higher. This reaction causes corrosion and forms a silicate glass from the silicon comprising material. Deep pitting and CO evolution can degrade the performance of the silicon comprising material. Additionally, this may prevent EBCs from acting as optimal water recession barriers for silicon comprising substrates as silicate glass has a high recession rate.

Embodiments of the present invention improve upon prior coated silicon comprising materials, particularly EBC systems used upon silicon comprising material substrates. These embodiments are generally applicable to components that operate within environments of relatively high temperatures, and are thus subjected to thermal cycling, stresses, oxidation, and corrosion. Examples of such components include, but are not limited to, combustor components, blades, shrouds, flaps, seals, vanes, and other components of gas turbine engines.

Referring to FIG. 1, an EBC system 10 of a first embodiment is shown. The EBC system 10 includes an EBC 12, and a surface region 16 or substrate of a component 18. The component 18, or at least the surface region (substrate) 16 of the component 18, is formed of a silicon comprising material (particularly those for articles exposed to high temperatures), such as SiC/SiC ceramic matrix composites (CMC). However, embodiments of the invention are generally applicable to other materials comprising silicon. Examples of silicon comprising materials include, but are not limited to, those with a dispersion of silicon carbide, silicon carbide and/or silicon particles as a reinforcement material in a metallic or nonmetallic matrix. Also included are those having a silicon carbide, silicon aluminum oxynitride, silicon nitride and/or silicon comprising matrix, and particularly composite materials that employ silicon carbide, silicon nitride and/or silicon as both the reinforcement and matrix materials (e.g., SiC/SiC ceramic matrix composites (CMC)). Silicon comprising materials further include metal silicides including, but not limited to, molybdenum and niobium silicides. Thus, according to embodiments of the invention, the silicon comprising substrate 16 may be a silicon comprising ceramic material as, for example, silicon carbide, silicon nitride, silicon carbon nitride, silicon oxynitride and silicon aluminum oxynitride. In accordance with one embodiment, the silicon comprising substrate 16 comprises a silicon comprising matrix with reinforcing fibers, particles and the like and, more particularly, a fiber reinforced silicon based matrix. Particularly suitable ceramic substrates are a silicon carbide coated silicon carbide fiber-reinforced silicon carbide particle and silicon matrix, a carbon fiber-reinforced silicon carbide matrix and a silicon carbide fiber-reinforced silicon nitride matrix. Particularly useful silicon-metal alloys for use as substrates 16 for the article of embodiments of the invention include molybdenum-silicon alloys, niobium-silicon alloys, and other Si comprising alloys having a coefficient of thermal expansion compatible with the other layer(s) described herein.

In accordance with one embodiment, the surface region or substrate 16 of the component 18 is protected by the multi-layer EBC system 10 that includes the EBC 12 for providing environmental protection to the component 18. Optionally, a top coat or conventional thermal barrier coating (not shown), as well as optional conventional intermediate layer(s) (not shown) may be provided on top of the EBC 12 for providing further thermal insulation to the underlying layers depending upon desired operational temperatures.

The multi-layered EBC 12 of the embodiment shown in FIG. 1, preferably has four layers, as shown therein. These four layers may include a bond layer 22, a first layer 24, a second layer 26 and a third layer 28. The bond layer 22 overlays the substrate 16 of the component 18 and preferably comprises silicon, such as at least one of silicon metal and silicon dioxide. This bond layer 22 is useful to improve oxidation resistance of the surface region 16 and enhance bonding between the first layer 24 and the surface region 16, particularly if the surface region 16 comprises silicon carbide or silicon nitride. A suitable thickness for the bond layer 22 is about 12.5 to about 250 micrometers. Suitable materials for bond layer 22 also include those described in the afore-referenced U.S. Pat. No. 6,410,148. For example, bond layer 22 can include a silicon metal or a $SiO_2$ layer.

The first layer 24 is located on the bond layer 22 and comprises mullite. This mullite comprising first layer 24 serves to adhere the second layer 26 to the surface region 16, while also preventing interactions between the second layer 26 and the silicon comprising surface region 16 at elevated temperatures. The first layer 24 may also comprise BSAS for less demanding applications, e.g. temperatures below about 1300° C. The addition of BSAS to the layer 24 is also relatively compatible with the silicon comprising surface region 16 in terms of having a CTE of about 5.27 ppm/° C., as compared to a CTE of about 4.9 ppm/° C. for SiC/SiC CMC. Preferably, first layer 24 comprises mullite-barium strontium aluminosilicate (BSAS) in an amount of between about 40 to 80 wt. % mullite and between about 20 to 60 wt. % BSAS. A suitable thickness range for the mullite comprising first layer 24 is about 25 to about 250 micrometers.

The second layer 26 overlies the first mullite comprising layer 24 and typically comprises BSAS and may consist essentially of BSAS. This layer provides excellent environmental protection and thermal barrier properties due to its low thermal conductivity. Particularly, BSAS can serve as an environmental barrier to the underlying mullite comprising layer 24, which would exhibit significant silica activity and volatilization if exposed to water vapor at high temperatures. Additionally, BSAS is physically compliant with a SiC comprising substrate, such as that suitable for surface region 16, and is relatively compatible with the mullite comprising layer 24 and the silicon comprising surface region 16 in terms of CTE. A suitable thickness range for layer 26 is about 25 to about 500 micrometers, depending upon the particular application.

The second layer 26 may alternatively or additionally comprise a rare earth silicate, such as described in U.S. Pat. No. 6,759,151. For example, rare earth silicates, such as those described in U.S. Pat. No. 6,759,151 may be employed as in place of the BSAS described herein or admixed therewith. As a further example, rare earth silicates include, but are not limited to, $RE_2O_3$, $SiO_2$, $2RE_2O_3.3SiO_2$, $RE_2O_3.2SiO_2$, and combinations thereof, where RE is a rare earth element selected from the group consisting of Sc, Dy, Ho, Er, Tm, Yb, Lu, Eu, Gd, Th and combinations thereof.

In the embodiment shown in FIG. 1, the EBC 12 also comprises a cerium oxide ($CeO_2$) layer 28 (third layer 28) located on top of the second layer 26. A suitable thickness range for this layer is between about 5 to about 75 micrometers, also depending upon the particular application. Alternatively, the cerium oxide may be admixed with the second layer 26. For example, cerium oxide may be admixed in any suitable amounts such as in a 50:50 weight percentage with the constituents of the second layer 26.

In alternate embodiments of the invention, the EBC 12 may comprise the second layer 26 deposited directly on the substrate comprising silicon and the third layer 28 deposited on the second layer 26. Alternatively, an admixed layer of the second layer and the third layer 28 may be deposited on the substrate comprising silicon. It should be noted that in these embodiments, bond layer 22 may also be employed and deposited directly on the substrate comprising silicon with the additional layers deposited on the bond layer 22.

Thus, in accordance with embodiments of the invention, a single layer EBC of BSAS and $CeO_2$ admixed therewith, as described above, may be used to provide environmental protection to the underlying silicon comprising material. This embodiment is particularly useful for operating temperatures below about 3000° F. (1371° C.), Alternatively, a $CeO_2$ layer, as described above, may be deposited on top of the BSAS layer.

The layers 22, 24, 26 and 28 can be individually deposited by air and vacuum plasma spraying (APS and VPS, respectively), though it is foreseeable that deposition could be performed by other techniques, such as chemical vapor deposition (CVD) and high velocity oxy fuel (HVOF). A heat treatment may also be performed after deposition of the individual layers to relieve stresses created during cooling from elevated deposition temperatures.

Accordingly, Applicant has advantageously determined that deposition of this high melting point acidic compound, $CeO_2$, will result in dissolution into the basic corrosion melt and increase the eutectic temperature and/or decrease the basicity of the solution. This will advantageously slow and/or stop the silicate glass formation on the surface of the silicon comprising material by raising the melting point or decreasing the basicity of the silicate glass of the corrodant mix.

While various embodiments are described herein, it will be appreciated from the specification that various combinations of elements, variations and improvements therein may be made by those skilled in the art, and are within the scope of the invention.

What is claimed is:

1. An article comprising:
    a gas turbine engine component substrate comprising a silicon material; and
    an environmental barrier coating overlying the substrate, wherein the environmental barrier coating comprises cerium oxide, and the cerium oxide reduces formation of silicate glass on the substrate upon exposure to corrodant sulfates.

2. The article of claim 1, wherein the environmental barrier coating comprises a multi-layer system comprising:
    a bond layer comprising a silicon material and overlying the substrate;
    a first layer comprising mullite and overlying the bond layer;
    a second layer comprising barium strontium aluminosilicate and overlying the first layer;
    a third layer consisting of the cerium oxide and overlying the second layer.

3. The article of claim 2, wherein the first layer comprises mullite-barium strontium aluminosilicate in an amount between about 40 to 80 weight percent mullite and about 20 to 60 weight percent barium strontium aluminosilicate.

4. The article of claim 3, wherein the bond layer has a thickness between about 12.5 and 250 micrometers, the first layer has a thickness between about 25 and 250 micrometers, the second layer has a thickness between about 25 and 500 micrometers, and the third layer has a thickness of about 5 to about 75 micrometers.

5. The article of claim 4 further comprising a thermal barrier coating overlying the third layer.

6. The article of claim 2, further comprising a rare earth silicate in the environmental barrier coating.

7. The article of claim 1, wherein the substrate is formed of a material selected from the group consisting of metal matrix composites reinforced with at least one of silicon carbide, silicon nitride and silicon; composites having a matrix of at least one of silicon carbide, silicon nitride and silicon; and composites with at least one of a silicon carbide, silicon carbide matrix reinforced with at least one of silicon carbide, silicon nitride, silicon aluminum oxynitride and silicon; and metal silicides.

8. The article of claim 7, wherein the substrate is a composite comprising a silicon based matrix and a reinforcing particle.

9. The article of claim 8, wherein the substrate is selected from the group consisting of a silicon carbide fiber-reinforced silicon carbide matrix, a carbon fiber-reinforced silicon carbide matrix and a silicon carbide fiber-reinforced silicon nitride.

10. The article of claim 1 wherein the substrate is a silicon comprising metal alloy selected from the group consisting of molybdenum-silicon alloys, niobium silicon alloys, iron-silicon alloys and iron-nickel-silicon based alloys.

11. The article of claim 1, wherein the environmental barrier coating further comprises a rare earth silicate.

12. The article of claim 11, wherein the environmental barrier coating further comprises barium strontium aluminosilicate.

13. The article of claim 1, wherein the substrate is selected from the group consisting of a silicon comprising ceramic and metal alloy comprising silicon.

14. A gas turbine engine component comprising:
    a substrate of the gas turbine engine component comprising a silicon material; and
    at least one layer on the substrate selected from the group consisting of: i) a layer comprising barium strontium aluminosilicate and cerium oxide, and ii) a dual layer of barium strontium aluminosilicate and a layer consisting of cerium oxide overlying the barium strontium aluminosilicate; wherein the cerium oxide reduces formation of silicate glass on the substrate.

15. A gas turbine engine component comprising:
    a substrate of the gas turbine engine component comprising a silicon material;
    cerium oxide deposited directly on the substrate or admixed with the silicon material of the substrate, wherein the cerium oxide reduces formation of silicate glass on the substrate upon exposure to corrodant sulfates.

* * * * *